(12) United States Patent
Bae et al.

(10) Patent No.: US 10,624,014 B2
(45) Date of Patent: Apr. 14, 2020

(54) METHOD FOR RANDOM ACCESS BASED ON MOBILITY AND APPARATUS THEREOF

(71) Applicant: Samsung Electronics Co., Ltd., Suwon-si, Gyeonggi-do (KR)

(72) Inventors: Yun Gyu Bae, Suwon-si (KR); Ki Cheol Nam, Hwaseong-si (KR); Ki Sung Park, Suwon-si (KR); Han Sung Leem, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/125,059

(22) Filed: Sep. 7, 2018

(65) Prior Publication Data

US 2019/0075503 A1  Mar. 7, 2019

(30) Foreign Application Priority Data

Sep. 7, 2017  (KR) .................. 10-2017-0114210

(51) Int. Cl.
| | | |
|---|---|---|
| *H04W 36/30* | (2009.01) | |
| *H04W 74/08* | (2009.01) | |
| *H04W 72/04* | (2009.01) | |
| *H04W 36/00* | (2009.01) | |
| *H04B 17/318* | (2015.01) | |
| *H04W 52/50* | (2009.01) | |
| *H04W 52/48* | (2009.01) | |
| *H04W 52/36* | (2009.01) | |
| *H04W 52/34* | (2009.01) | |
| *H04W 52/28* | (2009.01) | |

(52) U.S. Cl.
CPC .......... *H04W 36/30* (2013.01); *H04B 17/318* (2015.01); *H04W 36/0083* (2013.01); *H04W 52/28* (2013.01); *H04W 52/343* (2013.01); *H04W 52/367* (2013.01); *H04W 52/48* (2013.01); *H04W 52/50* (2013.01); *H04W 72/0473* (2013.01); *H04W 74/0833* (2013.01); *H04W 52/282* (2013.01); *H04W 52/283* (2013.01); *H04W 52/285* (2013.01)

(58) Field of Classification Search
CPC ... H04W 28/04; H04W 72/04; H04W 72/042; H04W 88/08; H04W 36/30; H04W 74/0833; H04W 36/0083; H04W 72/0473; H04L 5/0007; H04B 17/318
USPC ...................................................... 370/329
See application file for complete search history.

(56) References Cited

U.S. PATENT DOCUMENTS

| | | |
|---|---|---|
| 9,060,367 B2 | 6/2015 | Sawai |
| 9,301,309 B2 | 3/2016 | Sawai |
| (Continued) | | |

OTHER PUBLICATIONS

International Search Report dated Dec. 12, 2018, issued in a counterpart International application No. PCT/KR2018/010523.

*Primary Examiner* — Gbemileke J Onamuti
*Assistant Examiner* — Sanjay K Dewan
(74) *Attorney, Agent, or Firm* — Jefferson IP Law, LLP

(57) ABSTRACT

An electronic device that performs a random access procedure based on mobility is provided. The electronic device includes a random access procedure to the same base station while increasing the coverage level when the mobility is low, and may abort the random access procedure when a specified number of preamble transmissions or more is performed and the mobility is high, so that the random access of the electronic device is prevented from being delayed.

17 Claims, 9 Drawing Sheets

(56) References Cited

U.S. PATENT DOCUMENTS

| | | | |
|---|---|---|---|
| 9,414,412 B2* | 8/2016 | Park | H04W 48/08 |
| 9,596,660 B2 | 3/2017 | Park et al. | |
| 9,661,663 B1 | 5/2017 | Lin et al. | |
| 9,686,796 B2 | 6/2017 | Sawai | |
| 9,832,706 B2 | 11/2017 | Miranda D'Orey et al. | |
| 9,900,912 B2 | 2/2018 | Huang et al. | |
| 10,004,075 B2 | 6/2018 | Sawai | |
| 2013/0315187 A1 | 11/2013 | Sawai | |
| 2015/0223259 A1 | 8/2015 | Sawai | |
| 2016/0165611 A1 | 6/2016 | Sawai | |
| 2016/0212769 A1 | 7/2016 | Huang et al. | |
| 2016/0255591 A1 | 9/2016 | Park et al. | |
| 2016/0262109 A1* | 9/2016 | Chen | H04W 4/70 |
| 2017/0105127 A1* | 4/2017 | Xiong | H04B 7/0456 |
| 2017/0215123 A1 | 7/2017 | Miranda D'Orey et al. | |
| 2017/0215193 A1 | 7/2017 | Sawai | |
| 2018/0054773 A1 | 2/2018 | Miranda D'Orey et al. | |
| 2018/0160454 A1 | 6/2018 | Huang et al. | |
| 2018/0167849 A1* | 6/2018 | Wang | H04W 56/00 |
| 2019/0069189 A1* | 2/2019 | Malas | H04W 24/02 |

* cited by examiner

METHOD FOR RANDOM ACCESS BASED ON MOBILITY AND APPARATUS THEREOF

CROSS-REFERENCE TO RELATED APPLICATION(S)

This application is based on and claims priority under 35 U.S.C. § 119(a) of a Korean patent application number 10-2017-0114210, filed on Sep. 7, 2017, in the Korean Intellectual Property Office, the disclosure of which is incorporated by reference herein its entirety.

BACKGROUND

1. Field

The disclosure relates to a random access technology based on mobility of an electronic device.

2. Description of Related Art

Internet has evolved, from a human-centered connection network where humans generate and consume information, into internet of things (IoT) network that exchanges information among distributed components such as objects. In the IoT environment, an intelligent internet technology (IT) service may be provided by collecting and analyzing data generated from connected objects to create new value for human life. The IoT may be applied to fields of smart home, smart building, smart city, smart car or connected car, smart grid, health care, smart home appliance, advanced medical service, and the like through the fusion and combination of existing information technology and various industries.

Electronic devices that may be included in IoT may have relatively low processing power and low battery capacity. In addition, since various objects may be connected to a network, a greater number of electronic devices may be connected to the network than communication devices such as conventional telephones. In addition, the characteristics of the IoT described above may be equally applied to machine type communication (MTC). Thus, a communication method based on the characteristics of IoT and machine-type communication, such as low power consumption and multiple accesses, may be required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a random access method based on a coverage level and an apparatus thereof.

Another aspect of the disclosure is to provide an internet of things (IoT) communication based on a cellular network may be performed. For example, based on various communication standards such as category-machine (Cat-M), narrowband-IoT (NB-IoT) or extended coverage global system for mobile communications (GSM) for IoT (EC-GSM) communication may be performed. In order to perform the IoT communication based on the cellular network, an electronic device must first access to the cellular network. To access to the cellular network, a random access procedure may be performed.

Another aspect of the disclosure is to provide a large number of electronic devices using IoT communication or machine type communication (MTC) may be located in the same cell. For example, when an electronic device performs a random access procedure as in a conventional communication device (e.g., a telephone), the throughput of the network may be reduced due to interference between electronic devices. Thus, interference may be reduced by limiting the transmission power of an electronic device using IoT communication or MTC. In this case, the same message may be repeatedly transmitted in order to increase the probability of successful transmission of the message. In addition, for an electronic device located on the outskirts of a cell, the transmit power may be gradually increased. However, when an electronic device with mobility moves between cells, the random access procedure may be delayed due to transmission repetitions. The delay of the random access procedure may reduce the throughput of the electronic device and the network and may cause a delay in data transmission.

Additional aspects will be set forth in part in the description which follows and, in part, will be apparent from the description, or may be learned by practice of the presented embodiments.

In accordance with an aspect of the disclosure, an electronic device is provided. The electronic device includes at least one sensor, a communication circuit, and at least one processor, wherein the at least one processor may receive a system information block including information about a plurality of coverage levels for random access to a first base station from the first base station by using the communication circuit, transmit a first message including a preamble at a first transmission power corresponding to a first coverage level of the plurality of coverage levels to the first base station multiple times by using the communication circuit, obtain movement information of the electronic device by using the communication circuit or the at least one sensor, and attempt random access to a second base station different from the first base station when a number of transmissions of the first message to the first base station is greater than or equal to a specified first value and the movement information of the electronic device meets a specified condition.

In accordance with another aspect of the disclosure, a random access method of an electronic device is provided. The method includes receiving a system information block including information about a plurality of coverage levels for random access to a first base station from the first base station by using a communication circuit of the electronic device, transmitting a first message including a preamble at a first transmission power corresponding to a first coverage level of the plurality of coverage levels to the first base station multiple times by using the communication circuit, obtaining movement information of the electronic device by using the communication circuit or at least one sensor, and attempting random access to a second base station different from the first base station when a number of transmissions of the first message to the first base station is greater than or equal to a specified first value and the movement information of the electronic device meets a specified condition.

In accordance with another aspect of the disclosure, an electronic device is provided. The electronic device includes a wireless communication circuit, a motion sensor, a processor electrically connected to the wireless communication circuit and the motion sensor, and a memory electrically connected to the processor, wherein the memory may include instructions, when the instructions are executed, to allow the processor to detect a movement of the electronic device by using the motion sensor, perform a random access procedure for establishing a communication link with a base station of a lower power wide area network (LPWAN), and when the detected movement exceeds a selected threshold, attempt to establish a random access channel (RACH), determine whether a number of transmissions of a first message is greater than or equal to a maximum number of preamble retransmissions of a current coverage level (CL) when the establishment of the RACH fails, abort the random access procedure when the number of transmissions of the first message reaches the maximum number of preamble retransmissions, and perform the random access procedure by increasing the number of preamble retransmissions when the number of transmissions of the first message does not reach the maximum number of preamble retransmissions.

According to various embodiments, the data transmission delay due to a random access delay may be prevented by determining a random access attempt to another base station based on the mobility of the electronic device.

In addition, according to various embodiments, the random access procedure may be prevented from being delayed by using adaptive preamble transmission power.

In addition, according to various embodiments, the random access procedure may be prevented from being delayed by determining the coverage level based on the average value of reference signal received power (RSRP).

In addition, various effects that are directly or indirectly understood through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modification of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
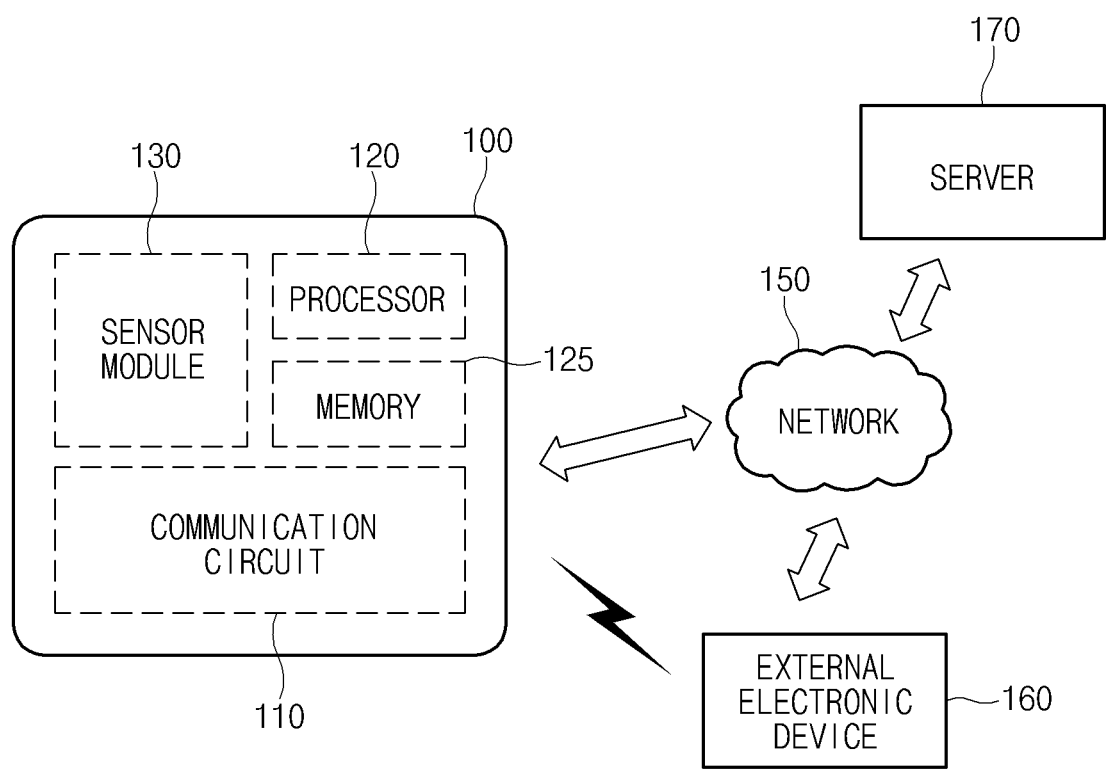
FIG. 1 illustrates a network environment supporting internet of things (IoT) according to an embodiment of the disclosure.

FIG. 1 is a block diagram of an electronic device according to an embodiment of the disclosure. FIG. 1 illustrates a network environment supporting Internet of things (IoT) according to various embodiments. Each of components may be one entity or a set of a plurality of entities.

Referring to FIG. 1, an electronic device 100 and an external electronic device 160 may refer to a device used by a user. The electronic device 100 and the external electronic device 160 may be referred to as a terminal, user equipment (UE), a mobile station, a subscriber station, a remote terminal, a wireless terminal, a user device, or other terms having equivalent technical meanings.

According to an embodiment, a network 150 may include one or more entities that communicate with the electronic device 100 through a wire/wireless channel. For example, the network 150 may include at least one of a base station (e.g., an access point (AP), an eNodeB (eNB), a 5th generation node (5G node), a gNB (next generation NodeB), a wireless point, a transmission/reception point (TRP), a 5th generation NodeB (5GNB), or other terms having equivalent technical meanings), a mobility management entity (MME), a gateway (GW) a home subscriber server (HSS), and/or a service capability exposure function (SCEF).

According to an embodiment, a server 170 may provide a service to the electronic device 100 through the network 150. The server 170 may be referred to as an application server (AS), a machine type communication (MTC) server, or a machine to machine (M2M) server.

According to an embodiment, the electronic device 100 may include a communication circuit 110, a processor 120, a memory 125, and a sensor module 130. The configuration of the electronic device 100 of FIG. 1 is exemplary, and the electronic device 100 may further include other components not shown in FIG. 1. For example, the processor 120 may be electrically connected to the sensor module 130, the communication circuit 110, and the memory 125.

In an embodiment, the communication circuit 110 provides an interface for communicating with other entities (e.g., a base station included in the network 150). The communication circuit 110 converts a bit string transmitted to another entity into a physical signal and converts a physical signal received from another entity into a bit string. In addition, the communication circuit 110 may transmit and receive signals. Thus, the communication circuit 110 may be referred to as a 'transmission unit', a 'reception unit', or a 'transmission/reception unit'.

According to an embodiment, the electronic device 100 (or, the communication circuit 110) may support an IoT network. For example, the communication circuit 110 may transmit/receive data to/from the network 150 in a predetermined frequency band. The predetermined frequency band may be used as a part of a frequency band used in another cellular network (e.g., long term evolution (LTE), universal mobile telecommunication system (UMTS), or global system for mobile communications (GSM)) (hereinafter, referred to as 'in-band'), may include a guard band used in another cellular network, or may be used as a frequency band used in another cellular network and a dedicated frequency band (hereinafter, referred to as a 'standalone'). As another example, the communication circuit 110 may communicate with the network 150 in a limited bandwidth for cost and battery consumption savings. The limited bandwidth may be narrower than that used in another cellular network. For example, the limited bandwidth may be 20 MHz, 1.4 MHz, or 180 KHz.

In an embodiment, the communication circuit 110 may access to the network 150 (e.g., a cellular network) in accordance with various communication standards such as a category-machine (Cat-M), narrowband-IOT (NB-IoT), or extended coverage GSM for IoT (EC-GSM). In an embodiment, the network 150 may include a low power wide area network (LPWAN). For example, the LPWAN may include a network based on the 3$^{th}$ generation partnership project (3GPP) standard. For example, the LPWAN may include at least one of an NB-IoT network, a Cat-M network, or an EC-GSM network. In an embodiment, the communication circuit 110 may detect a reference signal received power (RSRP) based on a reference signal (e.g., a sounding reference signal) received from a base station.

In an embodiment, the processor 120 may include at least one processor. For example, the processor 120 may include at least one of an application processor or a cellular processor. In an embodiment, the processor 120 may be driven based on a program stored in the memory 125 of the electronic device 100. For example, the memory 125 may store instructions that allow the processor 120 to perform various operations. In the following description, the operation of the processor 120 may be performed according to the instructions stored in the memory 125. In an embodiment, the processor 120 may be configured to control other components of the electronic device 100. In the following description, the operation of the electronic device 100 may be referred to as an operation performed by the processor 120, unless otherwise described.

In an embodiment, the sensor module 130 may include at least one sensor. In an embodiment, the sensor module 130 may sense information (e.g., a speed, a position, or an acceleration) associated with the mobility of the electronic device 100. For example, the sensor module 130 may be referred to as a motion sensor. For example, information associated with mobility may be referred to as movement. For example, the sensor module 130 may include at least one of an acceleration sensor, a gyro sensor, a terrestrial magnetic sensor, an atmospheric pressure sensor, an altitude sensor, or a global positioning system (GPS) based sensor. For example, the sensor module 130 may sense information associated with the mobility of the electronic device 100 based on at least one of an acceleration sensed by an acceleration sensor, a speed sensed by a speed sensor, a motion sensed by a gyro sensor, a change in a magnetic field sensed by a geomagnetic sensor, a change in an atmospheric pressure sensed by an atmospheric pressure sensor, a change in an altitude sensed by an altitude sensor, or a change in a position sensed by a position sensor.

In an embodiment, the electronic device 100 may use Internet of things based on a cellular network. For example, the electronic device 100 may transmit information sensed by the sensor module 130 through the cellular network. To transmit data through the cellular network, the electronic device 100 may be attached to a cell. In an embodiment, the electronic device 100 may select a cell based on the reference signal received from the base station and perform an attach procedure for the selected cell. To attach to a network, the electronic device 100 may perform a random access procedure.

In an embodiment, the electronic device 100 may perform the random access procedure in case where the electronic device 100 performs an initial access to the base station, performs a handover, receives a request from the base station, receives a request for an uplink transmission of data, fails a radio link, or fails a handover. In an embodiment, when the electronic device 100 is powered on, the electronic device 100 may perform a random access procedure. Hereinafter, the random access procedure of the electronic device 100 will be described with reference to FIG. 2. The operation of the electronic device 100 described below may be performed by the processor 120.

Figure 2:
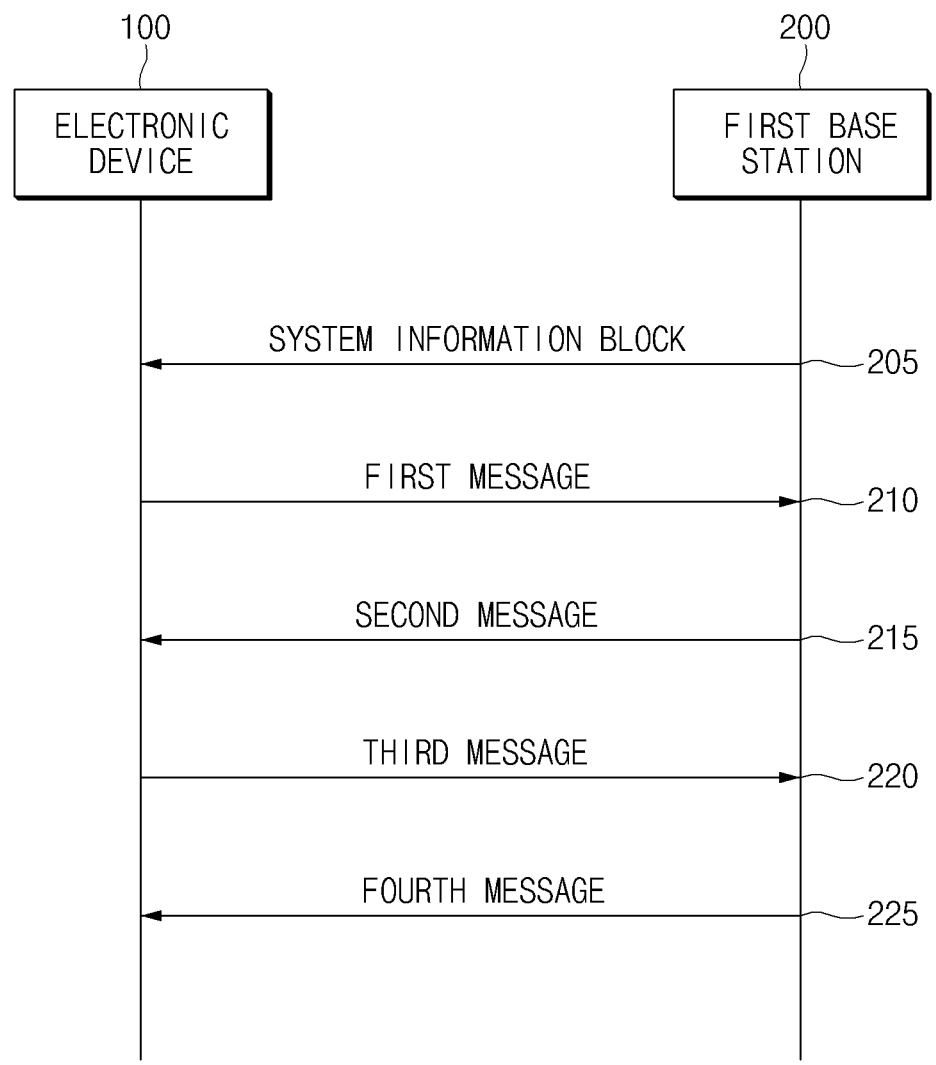
FIG. 2 illustrates a random access procedure according to an embodiment of the disclosure.

FIG. 2 illustrates a random access procedure according to an embodiment of the disclosure.

Referring to FIG. 2, the electronic device 100 (e.g., the processor 120) may attempt a random access to a first base station 200. For example, the electronic device 100 may determine whether to perform the random access to the first base station 200 based on a reference signal received from the first base station 200.

In operation 205, the electronic device 100 (e.g., the processor 120) may receive a system information block (e.g., system information block 2) from the first base station 200 through high layer signaling (e.g., radio resource control (RRC) signaling). In an embodiment, the system information block may include information for performing a random access procedure (e.g., information about a first message transmission resource and information about a preamble identifier).

In operation 210, the electronic device 100 may transmit a first message to the first base station 200. For example, the electronic device 100 may transmit the first message to the first base station 200 using the radio resource determined based on the information included in the system information block. For example, the first message may include a preamble. The preamble may be referred to as a random access preamble, a random access channel (RACH) preamble, or a physical RACH (PRACH) preamble. In an embodiment, the electronic device 100 may transmit a first message to the first base station 200 multiple times based on the system information block. For example, the electronic device 100 may transmit the first message one or more times to the first base station 200 based on a coverage level and repetitions per preamble attempt information corresponding to the coverage level. In an embodiment, the electronic device 100 may determine the coverage level based on the reference signal received from the first base station 200.

In operation 215, in response to the first message, the electronic device 100 may receive a second message from the first base station 200. For example, the second message may be referred to as a random access response, a RACH response, or a PRACH response. In an embodiment, the electronic device 100 may receive the second message within a specified time window. In an embodiment, the second message may include synchronization information and a temporary cell identifier for transmission of a third message.

In operation 220, the electronic device 100 may transmit a third message to the first base station 200 by using the information included in the second message. In an embodiment, the electronic device 100 may transmit the identifier of the electronic device 100 to the first base station 200 through the third message. For example, the third message may be referred to as a RRC connection request.

In operation 225, the electronic device 100 may receive a fourth message from the first base station 200. The fourth message may be referred to as a contention resolution message. In case of non-contention based random access, operation 225 may be omitted.

As described above with reference to FIG. 2, the electronic device 100 may transmit the first message to the first base station 200 multiple times. For example, the electronic device 100 may be a NB-IoT UE, a bandwidth reduced low complexity (BL) UE, or a coverage enhanced (CE) UE. In an embodiment, the repeated transmission of the first message may be performed based on a type and coverage level of the electronic device 100. Hereinafter, the repeated transmission of the first message will be described with reference to FIG. 3.

Figure 3:
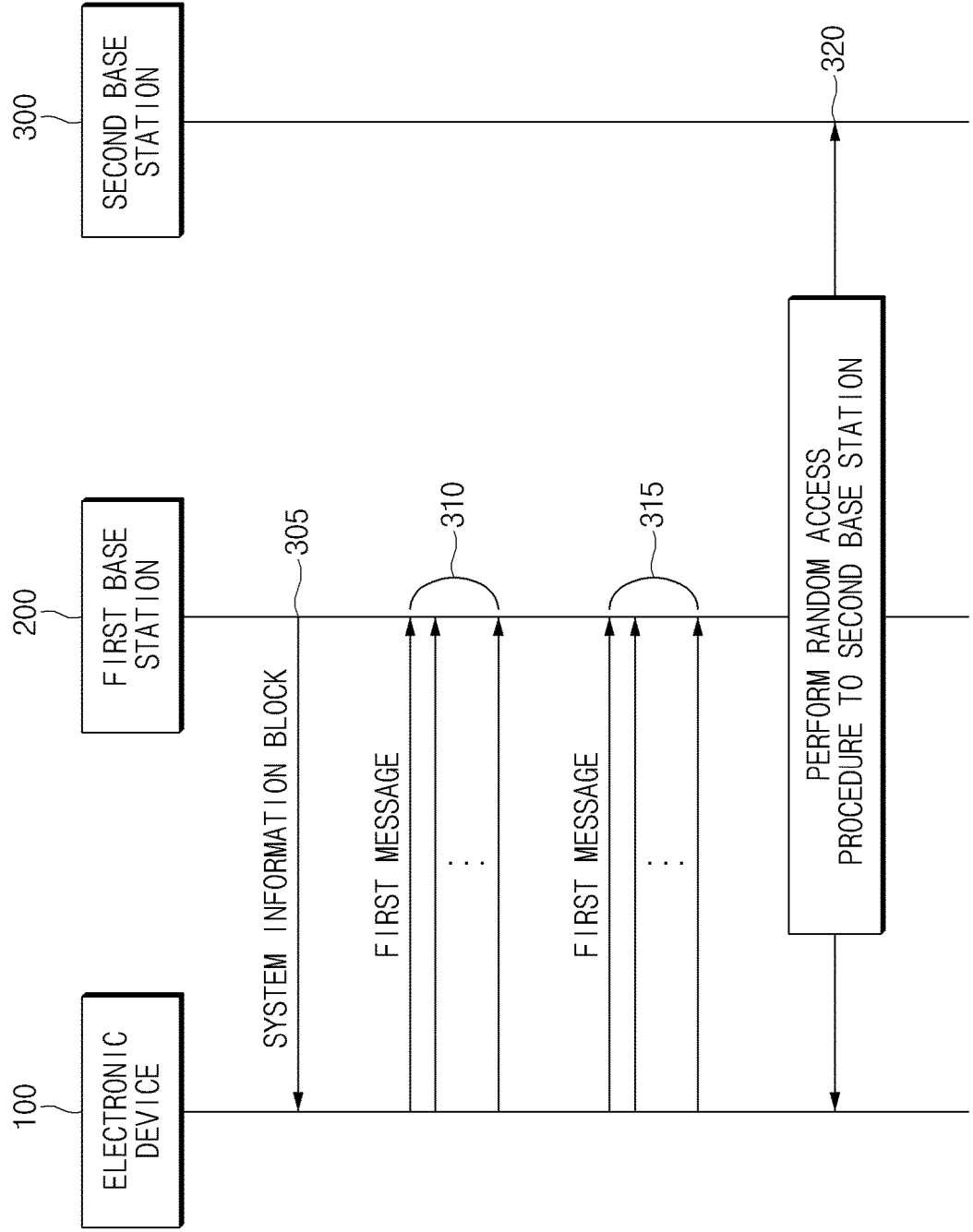
FIG. 3 illustrates a random access procedure to a second base station according to an embodiment of the disclosure.

FIG. 3 illustrates a random access procedure to a second base station according to an embodiment of the disclosure.

Referring to FIG. 3, in operation 305 the electronic device 100 (e.g., the processor 120) may receive the system information block (e.g., system information block 2) from the first base station 200. As described above with reference to FIG. 2, the electronic device 100 may transmit the first message to the first base station 200 by using the information included in the system information block. For example, the system information block may include information about a plurality of coverage levels. In an embodiment, the plurality of coverage levels may include three or four coverage levels. For example, the system information block may include the repetition per preamble attempt information (e.g., an integer greater than or equal to '1') of the coverage levels and the maximum number of preamble attempts (e.g., an integer greater than or equal to '1'). In an embodiment, to increase a coverage area, different numbers of repetitions per preamble attempt may be set to the coverage levels. For example, the number of repetitions per preamble attempt set to the coverage level of a higher level may be more than or equal to the number of repetitions per preamble attempt set to the coverage level of a lower level. In an embodiment, different maximum numbers of preamble attempts may be set to the coverage levels. For example, the maximum number of preamble attempts set to the coverage level of the higher level may be greater than or equal to the maximum number of preamble attempts set to the coverage level of the lower level. In an embodiment, different preamble transmission powers may be set to the coverage levels. For example, the preamble transmission power set to the coverage level of the higher level may be greater than the preamble transmission power set to the coverage level of the lower level.

In an embodiment, the electronic device 100 may receive a higher layer signaling (e.g., RRC signaling) including coverage enhancement (CE) mode (e.g., CE mode A or CE mode B) configuration information from the first base station 200. For example, two coverage levels may be set to each CE mode (e.g., CE mode A and CE mode B).

In operation 310, the electronic device 100 may perform one preamble attempt that includes one or more first message transmissions at a first coverage level. In an embodiment, the electronic device 100 may determine the first coverage level of a plurality of coverage levels based on the received power of the reference signal received from the first base station 200. In an embodiment, the electronic device 100 may determine the first coverage level based on the received power of the reference signal received from the first base station 200 and the CE mode setting information. For example, the electronic device 100 may determine one of the coverage levels corresponding to the CE mode (e.g., CE mode A or CE mode B) set by the first base station 200, based on the received power of the reference signal. In an embodiment, the electronic device 100 may transmit the first message at least once based on information about repetition per first preamble attempt corresponding to the first coverage level included in the system information block. In an embodiment, when the second message in response to a first message is not received within a specified time window from the first base station 200, the electronic device 100 may continue to perform the preamble attempt based on the first maximum number of preamble attempts corresponding to the first coverage level. For example, after performing the preamble attempt by the first maximum number of preamble attempts corresponding to the first coverage level, when the second message is not received, the electronic device 100 may increase the coverage level.

In operation 315, the electronic device 100 performs the preamble attempt corresponding to the maximum number of preamble attempts of the maximum coverage level at the maximum coverage level. When the number of preamble attempts at the maximum coverage level is equal to the maximum number of preamble attempts at the maximum coverage level, the electronic device 100 may perform an operation related to the radio connection failure. In the embodiment of FIG. 3, since the response to the preamble attempt is not received from the first base station 200, the electronic device 100 may perform cell selection based on the radio connection failure. For example, a second base station 300 may be selected based on the reference signal from the second base station 300.

In an embodiment, the first coverage level discussed above in connection with operation 310 may correspond to the maximum coverage level set for the electronic device 100. For example, the preamble attempt of operation 315 may be the last preamble attempt corresponding to the maximum number of preamble attempts set for the first coverage level. In an embodiment, the maximum coverage level described above in connection with operation 315 may correspond to a coverage level higher than the first coverage level. For example, the preamble attempt of operation 315 may be the last preamble attempt corresponding to the maximum number of preamble attempts set for the maximum coverage level. In an embodiment, there may be a second coverage level higher than the first coverage level and lower than the maximum coverage level. For example, between operations 310 and 315, the electronic device 100 may transmit the first message based on the maximum number of preamble attempts corresponding to the second coverage level at the second coverage level and the repetitions per preamble attempt information.

In operation 320, the electronic device 100 may perform a random access procedure to the second base station 300. Thus, when the response (e.g., the second message) corresponding to the preamble attempt is not received, multiple preamble attempts may be performed depending on the coverage level. In the following description, the iterative transmission of the first message based on coverage level is described with reference to FIG. 4.

Figure 4:
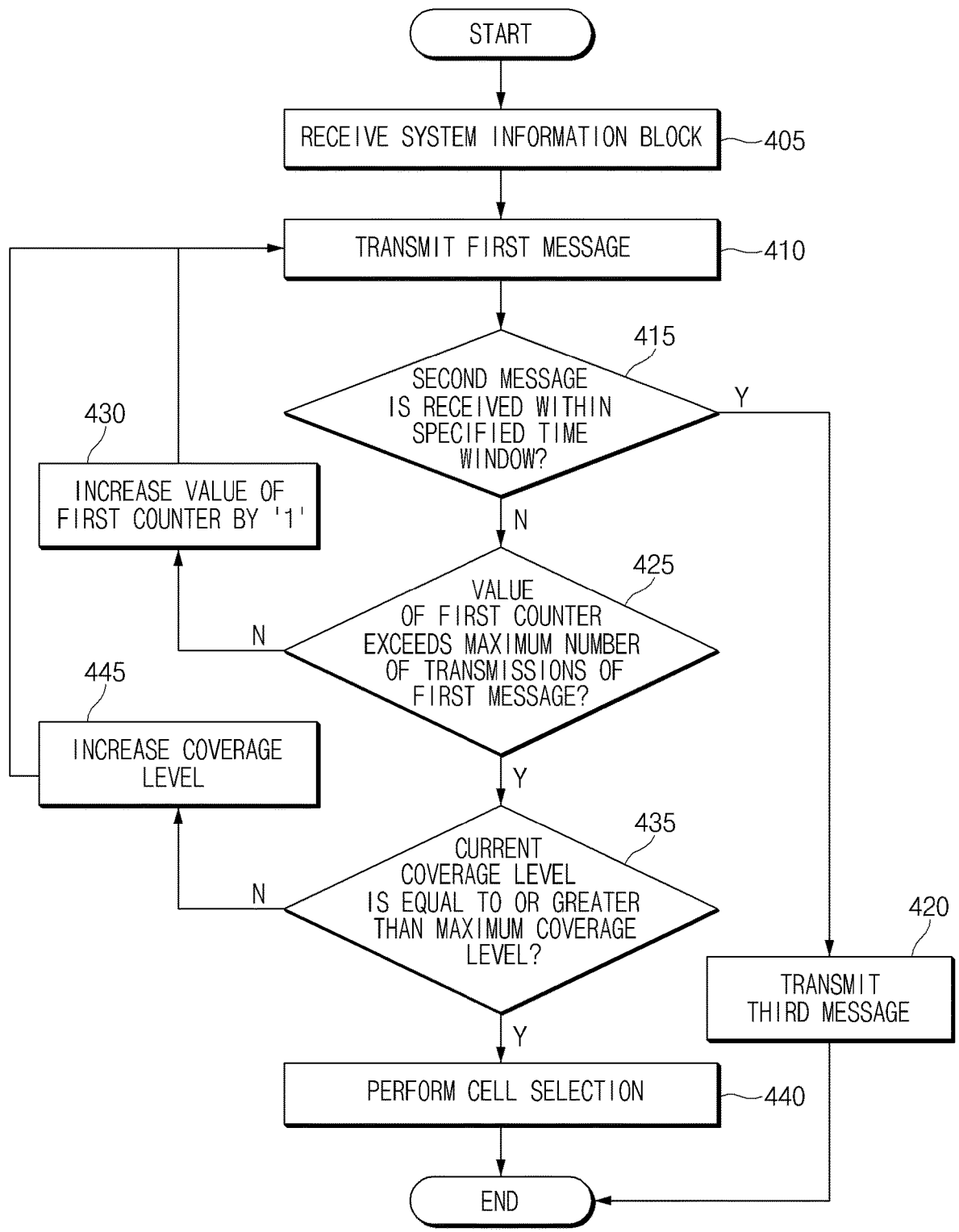
FIG. 4 is a flowchart illustrating a random access method in a first mode according to an embodiment of the disclosure.

FIG. 4 is a flowchart illustrating a random access method in a first mode according to an embodiment of the disclosure.

Referring to FIG. 4, when the electronic device 100 does not receive a response (e.g., the second message) corresponding to a preamble attempt from a base station (e.g., the first base station 200), the connection of the electronic device 100 to the network may be delayed due to the repetition of preamble attempts. For example, the electronic device 100 may move from a first cell of the first base station 200 to a second cell of the second base station 300. In this case, it is possible to prevent the connection delay of the electronic device 100 by attempting random access to the second base station 300 rather than attempting random access to the first base station 200. Therefore, a random access method that is changed depending on the mobility of the electronic device 100 may be used. For example, an operational mode (e.g., a first mode or a second mode), in which the random access method changed depending on the mobility of the electronic device 100 is used, may be set in the electronic device 100. For example, the processor 120 may determine the mobility of the electronic device 100 based on the information sensed by the sensor module 130. For example, the first mode may correspond to a random access method of the electronic device 100 having low mobility. For example, the second mode may correspond to a random access method of the electronic device 100 having high mobility.

Hereinafter, the random access method of the electronic device 100 (e.g., the processor 120) in the first mode will be described with reference to FIG. 4. According to an embodiment, the electronic device 100 may set one of the plurality of coverage levels as a current coverage level based on the received power of the reference signal received from a base station (e.g., the first base station 200).

In operation 405, the processor 120 of the electronic device 100 may receive the system information block from the base station by using the communication circuit 110. The reception of the system information block may be referred to by the description described above with reference to FIGS. 2 and 3.

In operation 410, the processor 120 may transmit the first message including a preamble based on a specified value to a base station (e.g., the first base station 200) at least once by using the communication circuit 110. For example, the processor 120 may transmit the first message repeatedly (e.g., one or more times) based on the repetitions per preamble attempt information for the currently set coverage level. For example, the iterative transmission of the first message according to a specified value (e.g., a number according to the repetition per preamble attempt information) may be referred to as one preamble attempt. For example, the preamble transmission based on a specified value may be referred to as an attempt to establish a RACH with a base station (e.g., the first base station 200).

When the second message is received within a specified time window in operation 415, the processor 120 may transmit a third message to the base station by using communication circuit 110 in operation 420. When the second message is not received within the specified time window in operation 415, the processor 120 may determine, in operation 425, whether the value of a first counter exceeds the maximum number of the first message repetitions (e.g., the maximum preamble attempt) for the currently set coverage level. For example, the non-receipt of the second message may be referred to as RACH failure or RACH establishment failure. For example, the first counter may correspond to the number of preamble attempts at the current coverage level. When the value of the first counter is less than or equal to the maximum number of the first message repetitions (e.g., the maximum preamble attempt), in operation 430, the processor 120 may increase the value of the first counter by one and transmit the first message at the currently set coverage level (e.g., operation 410). For example, when the value of the first counter is less than the maximum number of the first message repetitions, the processor 120 may transmit the first message (e.g., increasing the number of retransmissions of the first message) at the currently set coverage level. For example, the first counter may be referred to as a preamble transmission counter (e.g., PREAMBLE_TRANSMISSION_COUNTER). For example, the value of the first counter at each coverage level may be initialized to '1'. In an embodiment, an increase of the value of the first counter value may be referred to as a change of a parameter referred to as a preamble transmission counter.

When the value of the first counter is greater than or equal to the maximum number of the first message repetitions (e.g., the maximum preamble attempt), in operation 435, the processor 120 may determine whether the current coverage level is greater than or equal to the maximum coverage level set for the electronic device 100. When the current coverage level is greater than or equal to the maximum coverage level, in operation 440, the processor 120 may declare a radio connection failure and perform cell selection. When the current coverage level is less than the maximum coverage level, the processor 120 may increase the coverage level in operation 445. In an embodiment, the processor 120 may again perform the first message transmission (e.g., operation 410) at an increased coverage level. For example, the processor 120 may transmit the first message based on the preamble transmission power, the maximum number of preamble attempts, and the repetition per preamble attempt information corresponding to the increased coverage level. In the first mode described above with reference to FIG. 4, the electronic device 100 may attempt a random access while increasing the coverage level. In an embodiment, as the coverage level increases, the maximum number of preamble attempts, the preamble transmission power, and/or the number of repetitions per preamble attempt information corresponding to each coverage level may be increased. Thus, the possibility of successful reception of the preamble transmitted from the electronic device 100 located at the cell boundary at the base station may be increased.

In an embodiment, the electronic device 100 may move from the first cell to the second cell. For example, the electronic device 100 may move to the second cell while attempting a random access to the first base station of the first cell. In this case, the attempt of random access to the second base station in the second cell may be delayed because the preamble attempt (e.g., transmission of the first message) for the first base station is repeated. Hereinafter, a random access method for the electronic device 100 having mobility in the second mode will be described with reference to FIG. 5.

Figure 5:
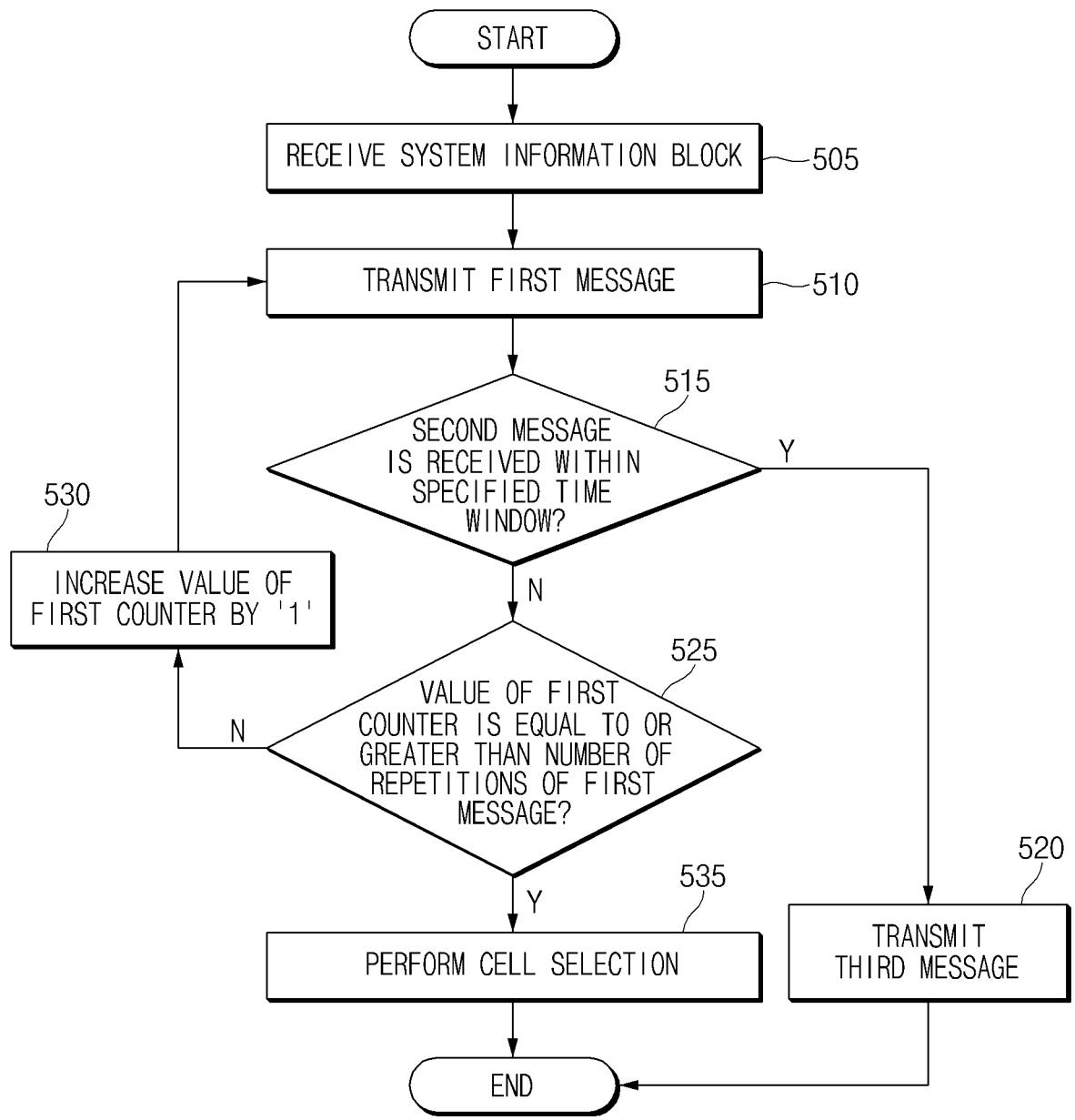
FIG. 5 is a flowchart illustrating a random access method in the second mode according to an embodiment of the disclosure.

FIG. 5 is a flowchart illustrating a random access method in the second mode according to an embodiment of the disclosure.

Referring to FIG. 5, a random access method of the electronic device 100 (e.g., the processor 120) in the second mode will be described with reference to FIG. 5. As described above with reference to FIG. 4, for example, the second mode may correspond to a random access method of the electronic device 100 having high mobility. The descriptions of operations 505, 510, 515, 520, 525, and 530 may be referenced by the descriptions of operations 405, 410, 415, 420, 425, and 430 described above with reference to FIG. 4. For convenience of explanation, redundant description will be omitted.

In operation 535, when the value of the first counter (e.g., a preamble transmission counter) exceeds the maximum preamble attempt for the current coverage level, the processor 120 of the electronic device 100 may perform the cell selection. As described above with reference to FIG. 4, when the number of preamble attempts is equal to or greater than the maximum number of preamble attempts of the currently set coverage level (e.g., the first counter value exceeds the maximum preamble attempt for the current coverage level), the electronic device 100 in the first mode may perform the preamble attempt while increasing the coverage level. However, in the second mode, as illustrated in FIG. 5, when the maximum preamble attempt for the currently set coverage level is performed, the electronic device 100 may perform the cell selection for random access to the second base station different from the first base station. Accordingly, the random access and data transmission may be prevented from being delayed due to the repetition of the preamble attempt (e.g., the repetitive transmission of the first message). In an embodiment, the electronic device 100 may select the first mode or the second mode based on a specified condition. Hereinafter, with reference to FIG. 6, a method of selecting the first mode or the second mode will be described.

Figure 6:
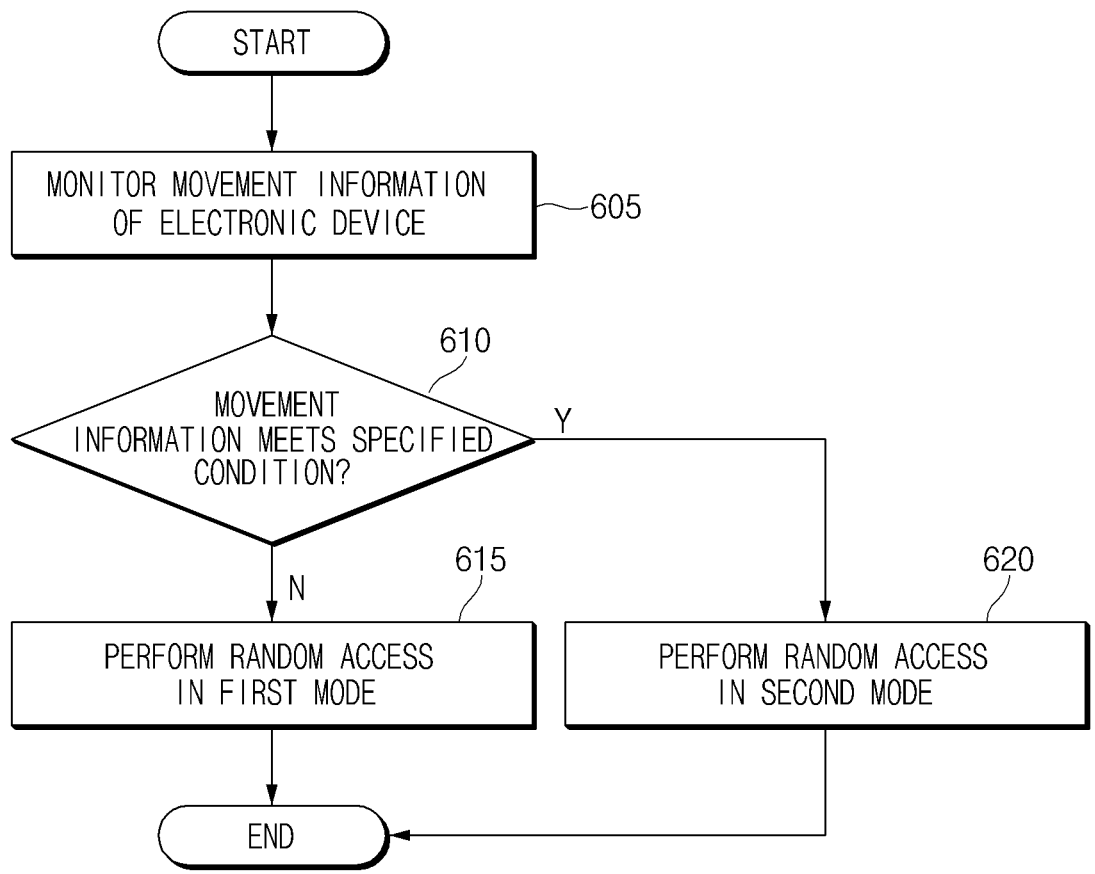
FIG. 6 is a flowchart illustrating a method of selecting a random access mode according to an embodiment of the disclosure.

FIG. 6 is a flowchart illustrating a method of selecting a random access mode according to an embodiment of the disclosure.

Referring to FIG. 6, when the electronic device 100 has mobility, random access to another cell may reduce an access delay rather than repetitive preamble attempts. Thus, according to an embodiment, the electronic device 100 (e.g., the processor 120) may select the first mode or the second mode based on the mobility of the electronic device 100.

In operation 605, the processor 120 of the electronic device 100 may monitor movement information of the electronic device 100 by using the sensor module 130 and/or the communication circuit 110. In an embodiment, the movement information may include at least one of a speed, an acceleration, a location, or a RSRP of the electronic device 100. For example, the processor 120 may use the sensor module 130 to sense the speed, acceleration, or location of the electronic device 100. For example, the processor 120 may sense the RSRP by using the communication circuit 110. In an embodiment, the processor 120 may determine the speed and/or acceleration of the electronic device 100 based on a change in a location of the electronic device 100. In an embodiment, the processor 120 may determine the relative change in the location of the electronic device 100 to the corresponding base station based on the change in the RSRP.

In operation 610, the processor 120 may determine whether the movement information meets the specified condition. In an embodiment, the specified condition may include a case where the speed of the electronic device 100 is greater than or equal to a first specified range, a case where the acceleration of the electronic device 100 is greater than or equal to a second specified range, a case where the variation of the location of the electronic device 100 is greater than or equal to a third specified range, or the variation of the RSRP is greater than or equal to a fourth specified range. In an embodiment, the electronic device 100 may move together with a base station (e.g., a macro base station).

In an embodiment, the electronic device 100 and the base station may be located within a single transport unit (e.g., a subway, a bus, or an airplane). In this case, despite the geographic position change of the electronic device 100, the relative distance between the electronic device 100 and the base station is not changed. Thus, in an embodiment, even though the speed, acceleration, or location information of the electronic device 100 meets the specified condition, the processor 120 may determine that the movement information does not meet the specified condition when the RSRP is not substantially changed.

When the movement information meets the specified condition (e.g., when the mobility of the electronic device 100 is high), in operation 620, the processor 120 may perform the random access in the second mode. The random access in the second mode may be referred to by the description related to FIG. 5. When the movement information does not meet the specified condition (e.g., when the mobility of the electronic device 100 is low), in operation 615, the processor 120 may perform the random access in the first mode. The random access in the first mode may be referred to by the description related to FIG. 4.

In the description related to FIG. 6, it has been described that the specified condition is satisfied when the mobility of the electronic device 100 is high. However, the specified condition may be satisfied when the mobility of the electronic device 100 is low. For example, the specified condition may include a case where the speed of the electronic device 100 is less than the first specified range, a case where the acceleration of the electronic device 100 is less than the second specified range, a case where the variation of the location of the electronic device 100 is less than the third specified range, or a case where the variation of the RSRP is less than the fourth specified range. In this case, the electronic device 100 may perform the random access in the first mode when the specified condition is satisfied, and may perform the random access in the second mode when the specified condition is not satisfied. Hereinafter, an arbitrary-procedure performing method of the electronic device 100 will be described with reference to FIGS. 7 and 8.

Figure 7:
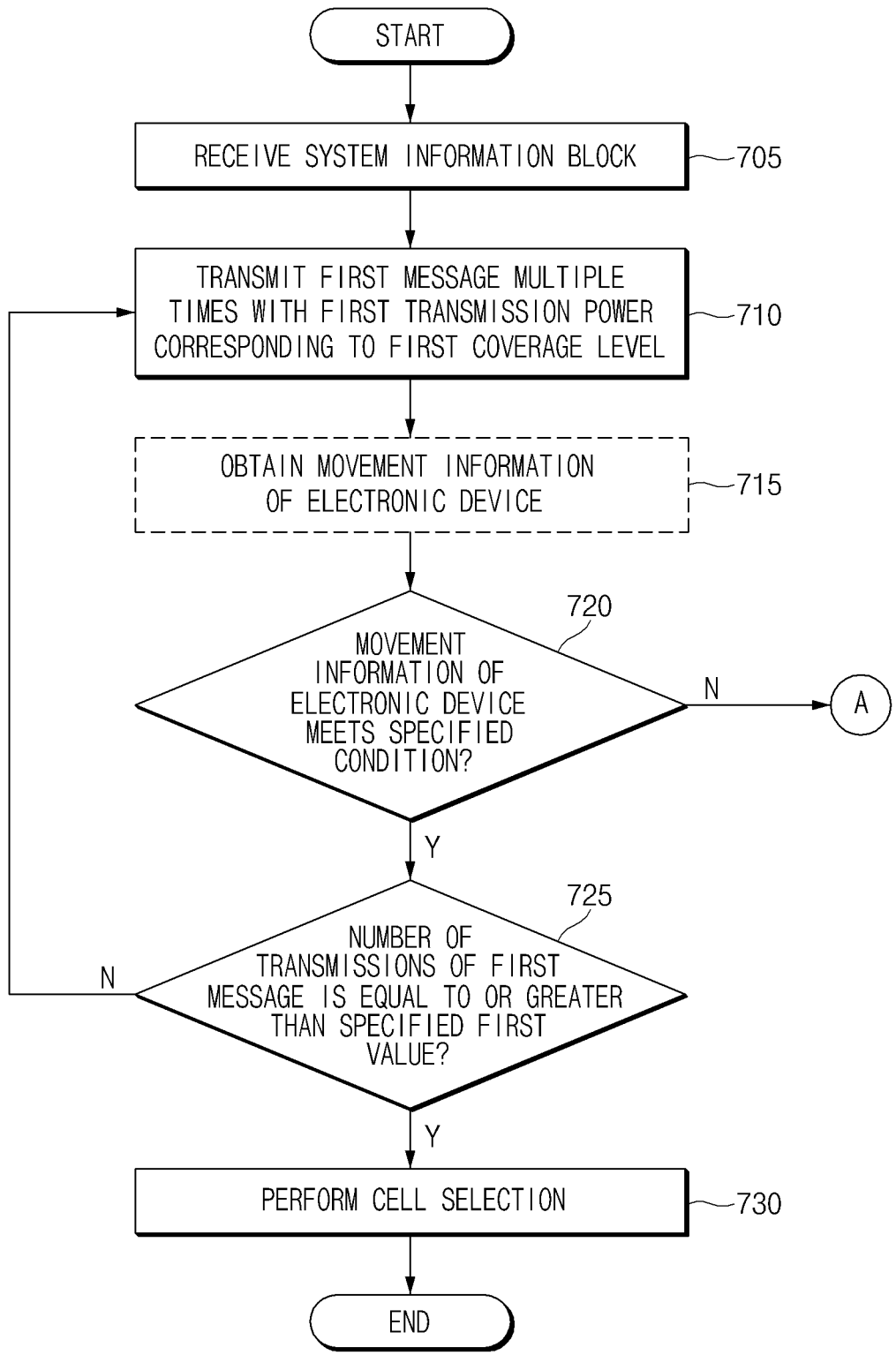
FIG. 7 is a flowchart illustrating a random access method according to an embodiment of the disclosure.

FIG. 7 is a flowchart illustrating a random access method according to an embodiment of the disclosure.

Referring to FIG. 7, in operation 705 the processor 120 may receive a system information block (e.g., system information block 2) from the first base station 200 by using the communication circuit 110. For example, the system information block may include information about a plurality of coverage levels (e.g., a maximum coverage level, a maximum number of preamble attempts for a plurality of coverage levels, and a number of repetitions per preamble attempt).

The processor 120 may attempt to establish RACH with the first base station 200. For example, in operation 710, the processor 120 may use the communication circuit 110 to transmit the first message to the first base station 200 multiple times at the first transmission power corresponding to the first coverage level.

In an embodiment, the processor 120 may determine the first coverage level based on the received power of the reference signal received from the first base station 200. For example, the processor 120 may determine the first coverage level based on the received power of the most recently received reference signal received from the first base station 200. In an embodiment, the processor 120 may determine the first coverage level based on the received power of the most recently received reference signal and an average of the received powers of the plurality of previously received reference signals. For example, the average of the received powers of the plurality of previously received reference signals may be an average of the received powers of the specified number of reference signals received before the last received reference signal or of the received powers of the reference signals received within a specified time interval before the last received reference signal. In an embodiment, a first weight may be applied to the received power of the last received reference signal and a second weight may be applied to the average of the received powers of the plurality of previously received reference signals. For example, the sum of the first and second weights may be '1'. For example, after applying the first and second weights, the processor 120 may determine a value of the received power of the reference signal for determining the first coverage level by adding the received power of the last received reference signal and the average of the received powers of the plurality of previously received reference signals to which the first and second weights are applied, respectively. In an embodiment, the first weight and/or the second weight may be adjusted based on the mobility of the electronic device 100. For example, the processor 120 may increase the value of the second weight as the mobility of the electronic device 100 increases. As another example, the processor 120 may increase the value of the first weight as the mobility of the electronic device 100 is lower.

In an embodiment, the processor 120 may determine the first transmission power based on the first coverage level. In an embodiment, when the first coverage level is a coverage level of '0', the processor 120 may transmit the first message at the first transmission power based on the corresponding number of repetitions per preamble attempt. For example, the first transmission power may correspond to a transmission power lower than the maximum transmission power of the electronic device 100. In an embodiment, when the first coverage level corresponds to coverage levels other than the coverage level of '0', the processor 120 may transmit the first message with the maximum transmission power of the electronic device 100.

In an embodiment, when the first coverage level is coverage level '0', the processor 120 may increase the first transmission power based on the number of transmissions of the first message. For example, the processor 120 may gradually increase the first transmission power based on the number of transmissions of the first message. In an embodiment, when the first coverage level is a coverage level of '0', the processor 120 may transmit the first message 'k' times with the maximum transmission power of the electronic device 100 after transmitting the first message 'm' times with the first transmission power. For example, the first transmission power may correspond to a transmission power that is lower than the maximum transmission power of the electronic device 100. For example, the delay of random access may be reduced by increasing the transmission power of the first message in an early stage. For example, the sum of 'm' and 'k' may be set equal to or less than the maximum number of preamble transmissions for the first coverage level (e.g., a value set by multiplying the maximum number of preamble attempts and the number of repetitions per preamble attempt). For example, the 'm' may be set to one-half of the maximum number of preamble transmissions for the first coverage level. In an embodiment, the value of the 'm' may be variably set based on the mobility of the electronic device 100. For example, when the mobility is high, the processor 120 may decrease the value of the 'm'. However, for example, when the mobility is low, the processor 120 may decrease the value of the 'm'.

In operation 715, the processor 120 may obtain the movement information of the electronic device 100 by using the communication circuit 110 and/or the sensor module 130. The description of the movement information may be referred to by the description given above with reference to FIG. 6. In an embodiment, the movement information may be obtained before or after operation 715. For example, as described above with reference to FIG. 6, the processor 120 may monitor the movement information. For example, the processor 120 may periodically obtain the movement information, and may obtain the movement information based on a specified condition and/or a time point.

In operation 720, the processor 120 may determine whether the movement information of the electronic device meets the specified condition. The specified condition may be referred to by the specified conditions described with reference to FIG. 6. When the specified condition is not met, the random access procedure may proceed to reference point A.

When the specified condition is met and the RACH establishment fails (e.g., the failure to receive the second message), in operation 725, the processor 120 may perform the random access procedure. In operation 725, the processor 120 may determine whether the number of transmissions of the first message is equal to or greater than a specified first value (e.g., the maximum number of preamble retransmissions for the current coverage level). When the number of transmissions of the first message is less than the specified first value, the processor 120 may repeat the transmission of the first message (e.g., increasing of the number of preamble retransmissions). When the number of transmissions of the first message is greater than or equal to the specified first value, the processor 120 may abort the random access procedure. For example, in operation 730, the processor 120 may perform cell selection for a random access to the second base station different from the first base station. Therefore, the random access procedure may be performed in the second mode described above with reference to FIG. 5.

In an embodiment, the specified first value may be set to be less than or equal to the maximum number of preamble transmissions for the first coverage level (e.g., a value corresponding to the product of the maximum number of preamble attempts for the first coverage level and the number of repetitions per preamble attempt for the first coverage level). In an embodiment, the first value may be set to be equal to the maximum number of preamble transmissions for the first coverage level. In this case, the electronic device 100 satisfying the specified condition may perform the cell selection procedure without increasing the coverage level. In an embodiment, the first value may be set to be an integer multiple of the number of repetitions per preamble attempt for the first coverage level, or may be defined based on the number of preamble attempts. For example, when the first value corresponds to the number of preamble attempts less than the maximum number of preamble attempts for the first coverage level, the random access procedure to the first base station may be early terminated.

Figure 8:
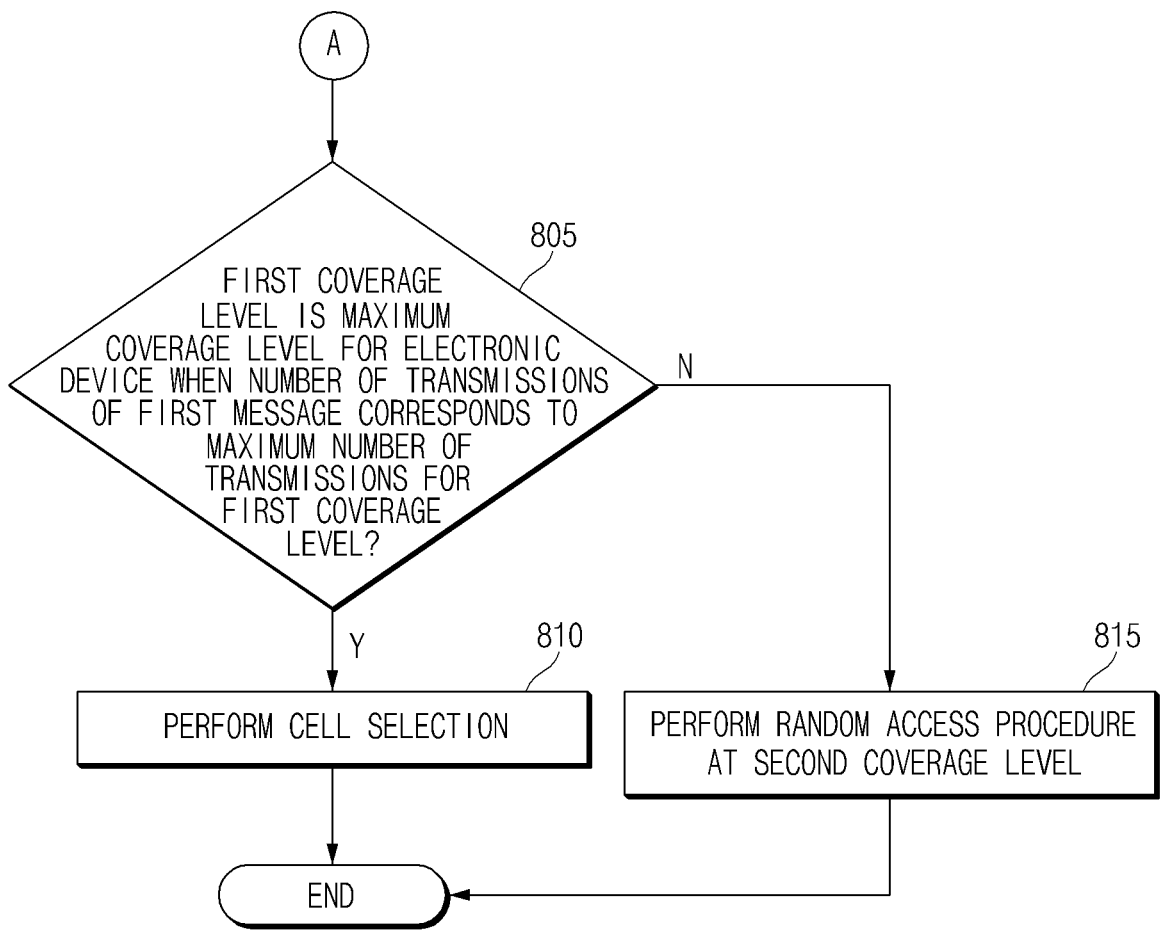
FIG. 8 is a flowchart illustrating a method of setting a coverage level according to an embodiment of the disclosure.

FIG. 8 is a flowchart illustrating a method of setting a coverage level according to an embodiment of the disclosure.

Referring to FIG. 8, when the condition specified is met in operation 720 described above and the RACH establishment fails (e.g., failure to receive the second message), the processor 120 may perform the random access procedure in operation 805. In operation 805, when the number of transmissions of the first message corresponds to the maximum transmission number for the first coverage level, the processor 120 may determine whether the first coverage level is the maximum coverage level for the electronic device 100. For example, the information about the maximum coverage level for the electronic device 100 may be included in the system information block.

In operation 810, when the first coverage level is the maximum coverage level, the processor 120 may perform cell selection to perform a random access procedure to a base station different from the first base station.

In operation 815, when the first coverage level is not the maximum coverage level, the processor 120 may perform a random access procedure for the first base station at the second coverage level. Therefore, the random access procedure may be performed in the first mode described above with reference to FIG. 4.

As described above, the mobility-based random access procedure has been described with reference to FIGS. 1 to 8. For example, at least in part of the above-described random access procedure may be performed according to various communication standards. For example, the above-described random access procedure may be implemented based at least in part on the 3rd generation partnership project (3GPP) technical specification 36.321.

As described above, an electronic device (e.g., the electronic device 100) disclosed in the disclosure may include at least one sensor (e.g., the sensor module 130), a communication circuit (e.g., the communication circuit 110), and at least one processor (e.g., the processor 120). The at least one processor may be configured to receive a system information block including information about a plurality of coverage levels for random access to a first base station from the first base station by using the communication circuit, transmit a first message including a preamble at a first transmission power corresponding to a first coverage level of the plurality of coverage levels to the first base station multiple times by using the communication circuit, obtain movement information of the electronic device by using the communication circuit or the at least one sensor, and attempt random access to a second base station different from the first base station when a number of transmissions of the first message to the first base station is greater than or equal to a specified first value and the movement information of the electronic device meets a specified condition.

According to an embodiment, the information about the plurality of coverage levels may include a maximum preamble attempt number and a number of repetitions per preamble attempt for the plurality of coverage levels.

According to an embodiment, the at least one processor may be configured to transmit the first message to the first base station at a second transmission power corresponding to a second coverage level of the plurality of coverage levels, which is higher than the first coverage level when the number of transmissions of the first message is greater than or equal to a specified second value and the movement information does not meet the specified condition, and the specified second value may be set based on a first maximum preamble attempt number for the first coverage level and a first number of repetitions per preamble attempt for the first coverage level.

According to an embodiment, the at least one processor may be configured to attempt random access to the second base station when the number of transmissions of the first message is greater than or equal to the specified second value, the movement information of the electronic device does not meet the specified condition, and the first coverage level is the highest coverage level of the plurality of coverage levels.

According to an embodiment, the first transmission power may correspond to a transmission power lower than a maximum transmission power of the electronic device when the number of transmissions of the first message is less than a specified third value, and may correspond to the maximum transmission power of the electronic device when the number of transmissions of the first message is greater than or equal to the specified third value.

According to an embodiment, the specified third value may be set based on the movement information of the electronic device.

According to an embodiment, a transmission power corresponding to each of remaining coverage levels of the plurality of coverage levels except for the first coverage level may correspond to the maximum transmission power of the electronic device.

According to an embodiment, the at least one processor may be configured to determine whether to retransmit the first message based on a maximum number of repetitions per first preamble attempt corresponding to the first coverage level when a second message in response to the first message within a specified time window is not received from the first base station after the first message is transmitted at least once based on information about repetition per first preamble attempt corresponding to the first coverage level.

According to an embodiment, the at least one sensor may be configured to sense at least one of a speed of the electronic device, an acceleration of the electronic device, or location information of the electronic device. The communication circuit may be configured to sense received power of a reference signal received from the first base station. The movement information of the electronic device may include at least one of the speed of the electronic device, the acceleration of the electronic device, the location information of the electronic device, or the received power of the reference signal.

According to an embodiment, the specified condition may include at least one of a case where the speed of the electronic device is greater than or equal to a specified first range, a case where the acceleration of the electronic device is greater than or equal to a specified second range, a case where a variation of a location of the electronic device is greater than or equal to a specified third range, or a case where a variation of the received power of the reference signal is greater than or equal to a specified fourth range.

According to an embodiment, the communication circuit may be configured to sense a received power of a reference signal received from the first base station, and the at least one processor may be configured to determine the first coverage level based on the received power of the reference signal.

According to an embodiment, the at least one processor may determine the first coverage level based on a received power of a reference signal last received from the first base station and an average of received powers of a plurality of reference signals previously received from the first base station.

According to an embodiment, the electronic device may include a narrow band internet of things user equipment (NB IoT UE) or a bandwidth reduced low complexity (BL) UE.

According to an embodiment, a random access method of an electronic device may include receiving a system information block including information about a plurality of coverage levels for random access to a first base station from the first base station by using a communication circuit of the electronic device, transmitting a first message including a preamble at a first transmission power corresponding to a first coverage level of the plurality of coverage levels to the first base station multiple times by using the communication circuit, obtaining movement information of the electronic device by using the communication circuit or at least one sensor, and attempting random access to a second base station different from the first base station when a number of transmissions of the first message to the first base station is greater than or equal to a specified first value and the movement information of the electronic device meets a specified condition.

According to an embodiment, the information about the plurality of coverage levels may include a maximum preamble attempt number and a number of repetitions per preamble attempt for the plurality of coverage levels.

According to various embodiments, an electronic device (e.g., the electronic device 100) may include a wireless communication circuit (e.g., the communication circuit 110), a motion sensor (e.g., the sensor module 130), a processor (e.g., the processor 120) electrically connected to the wireless communication circuit and the motion sensor, and a memory (e.g., the memory 125) electrically connected to the processor. The memory may include instructions, when the instructions are executed, to allow the processor to detect a movement of the electronic device by using the motion sensor, perform a random access procedure for establishing a communication link with a base station of a LPWAN, and when the detected movement exceeds a selected threshold, attempt to establish a RACH, determine whether a number of transmissions of a first message is greater than or equal to a maximum number of preamble retransmissions of a current coverage level (CL) when the establishment of the RACH fails, abort the random access procedure when the number of transmissions of the first message reaches the maximum number of preamble retransmissions, and perform the random access procedure by increasing the number of preamble retransmissions when the number of transmissions of the first message does not reach the maximum number of preamble retransmissions.

According to an embodiment, the wireless communication circuit may be implemented based at least on a 3GPP technical specification (TS) 36.321.

According to an embodiment, the increasing of the number of retransmissions may include changing a parameter referred to as a PREAMBLE_TRANSMISSION_COUNTER.

According to an embodiment, the LPWAN may include narrowband internet-of-things (NB IoT) based on a 3GPP standard.

According to an embodiment, the memory may include instructions, when the instructions are executed, to allow the processor to attempt to establish a RACH and determine whether a current coverage level is a maximum coverage level when the establishment of the RACH fails when the detected movement is less than or equal to the selected threshold, abort the random access procedure when the current coverage level is a maximum coverage level, and perform the random access procedure by increasing the number of retransmissions when the current coverage level is not the maximum coverage level.

Hereinafter, an example of the electronic device 100 capable of implementing various embodiments described with reference to FIGS. 1 to 8 will be described with reference to FIG. 9.

Figure 9:
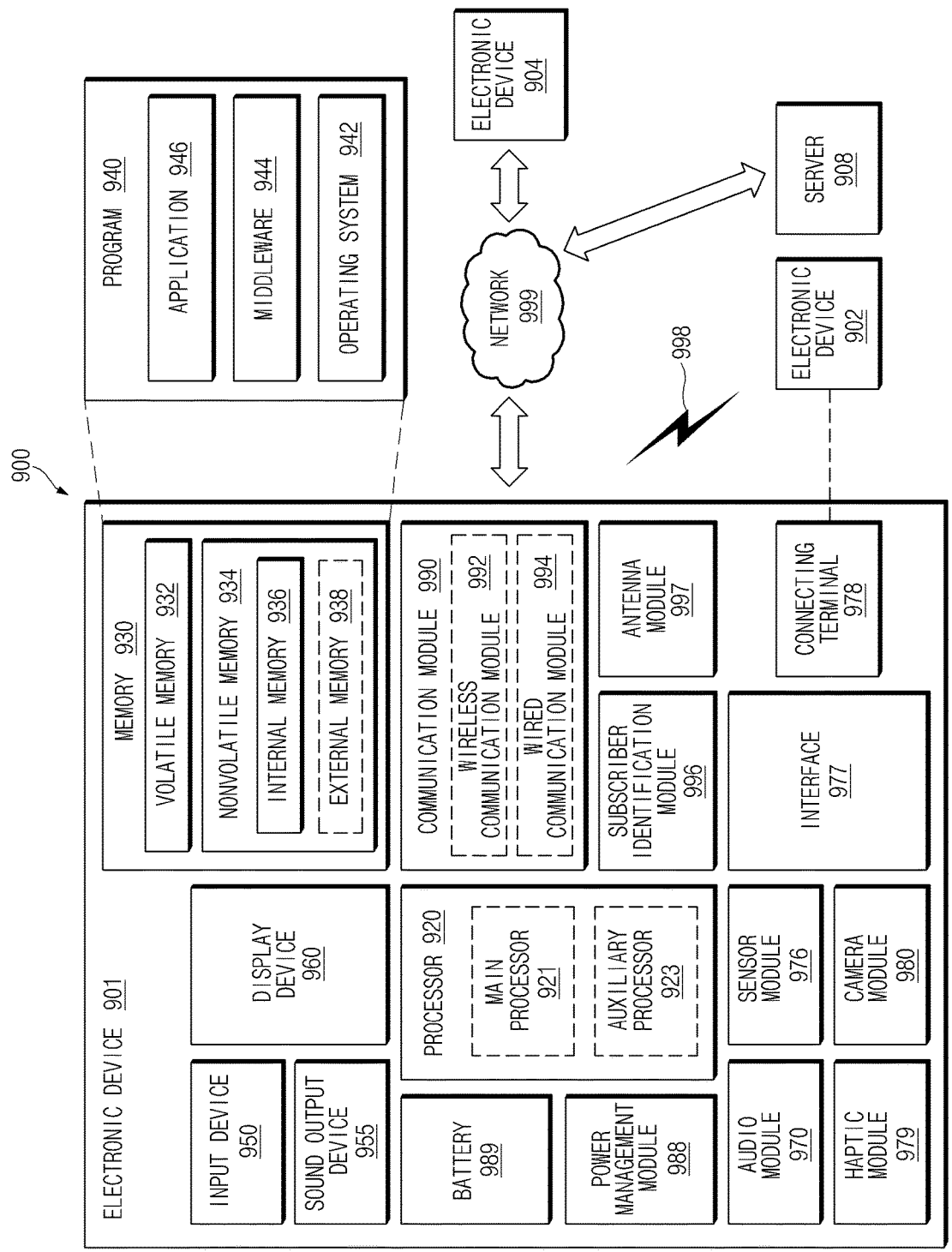
FIG. 9 is a block diagram of an electronic device, which performs random access based on mobility, in a network environment according to an embodiment of the disclosure.

FIG. 9 is a block diagram of an electronic device 901 (e.g., the electronic device 100), which performs random access based on mobility, in a network environment 900 according to various embodiments of the disclosure.

Referring to FIG. 9, the electronic device 901 may communicate with an electronic device 902 (e.g., the external electronic device 160) through a first network 998 (e.g., a short-range wireless communication) or may communicate with an electronic device 904 or a server 908 (e.g., the server 170) through a second network 999 (e.g., a long-distance wireless communication) (e.g., the network 150) in the network environment 900. According to an embodiment, the electronic device 901 may communicate with the electronic device 904 through the server 908. According to an embodiment, the electronic device 901 may include a processor 920 (e.g., the processor 12), a memory 930 (e.g., the memory 125), an input device 950, a sound output device 955, a display device 960, an audio module 970, a sensor module 976 (e.g., the sensor module 130), an interface 977, a haptic module 979, a camera module 980, a power management module 988, a battery 989, a communication module 990 (e.g., the communication circuit 110), a subscriber identification module 996, and an antenna module 997. According to some embodiments, at least one (e.g., the display device 960 or the camera module 980) among components of the electronic device 901 may be omitted or other components may be added to the electronic device 901. According to some embodiments, some components may be integrated and implemented as in the case of the sensor module 976 (e.g., a fingerprint sensor, an iris sensor, or an illuminance sensor) embedded in the display device 960 (e.g., a display).

The processor 920 may operate, for example, software (e.g., a program 940) to control at least one of other components (e.g., a hardware or software component) of the electronic device 901 connected to the processor 920 and may process and compute a variety of data. The processor 920 may load a command set or data, which is received from other components (e.g., the sensor module 976 or the communication module 990), into a volatile memory 932, may process the loaded command or data, and may store result data into a nonvolatile memory 934. According to an embodiment, the processor 920 may include a main processor 921 (e.g., a central processing unit or an application processor) and an auxiliary processor 923 (e.g., a graphic processing device, an image signal processor, a sensor hub processor, or a communication processor), which operates independently from the main processor 921, additionally or alternatively uses less power than the main processor 921, or is specified to a designated function. In this case, the auxiliary processor 923 may operate separately from the main processor 921 or embedded.

In this case, the auxiliary processor 923 may control, for example, at least some of functions or states associated with at least one component (e.g., the display device 960, the sensor module 976, or the communication module 990) among the components of the electronic device 901 instead of the main processor 921 while the main processor 921 is in an inactive (e.g., sleep) state or together with the main processor 921 while the main processor 921 is in an active (e.g., an application execution) state. According to an embodiment, the auxiliary processor 923 (e.g., the image signal processor or the communication processor) may be implemented as a part of another component (e.g., the camera module 980 or the communication module 990) that is functionally related to the auxiliary processor 923. The memory 930 may store a variety of data used by at least one component (e.g., the processor 920 or the sensor module 976) of the electronic device 901, for example, software (e.g., the program 940) and input data or output data with respect to commands associated with the software. The memory 930 may include the volatile memory 932 or the nonvolatile memory 934.

The program 940 may be stored in the memory 930 as software and may include, for example, an operating system 942, a middleware 944, or an application 946.

The input device 950 may be a device for receiving a command or data, which is used for a component (e.g., the processor 920) of the electronic device 901, from an outside (e.g., a user) of the electronic device 901 and may include, for example, a microphone, a mouse, or a keyboard.

The sound output device 955 may be a device for outputting a sound signal to the outside of the electronic device 901 and may include, for example, a speaker used for general purposes, such as multimedia play or recordings play, and a receiver used only for receiving calls. According to an embodiment, the receiver and the speaker may be either integrally or separately implemented.

The display device 960 may be a device for visually presenting information to the user and may include, for example, a display, a hologram device, or a projector and a control circuit for controlling a corresponding device. According to an embodiment, the display device 960 may include a touch circuitry or a pressure sensor for measuring an intensity of pressure on the touch.

The audio module 970 may convert a sound and an electrical signal in dual directions. According to an embodiment, the audio module 970 may obtain the sound through the input device 950 or may output the sound through an external electronic device (e.g., the electronic device 902 (e.g., a speaker or a headphone)) wired or wirelessly connected to the sound output device 955 or the electronic device 901.

The sensor module 976 may generate an electrical signal or a data value corresponding to an operating state (e.g., power or temperature) inside or an environmental state outside the electronic device 901. The sensor module 976 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 977 may support a designated protocol wired or wirelessly connected to the external electronic device (e.g., the electronic device 902). According to an embodiment, the interface 977 may include, for example, an HDMI (high-definition multimedia interface), a USB (universal serial bus) interface, an SD card interface, or an audio interface.

A connecting terminal 978 may include a connector that physically connects the electronic device 901 to the external electronic device (e.g., the electronic device 902), for example, an HDMI connector, a USB connector, an SD card connector, or an audio connector (e.g., a headphone connector).

The haptic module 979 may convert an electrical signal to a mechanical stimulation (e.g., vibration or movement) or an electrical stimulation perceived by the user through tactile or kinesthetic sensations. The haptic module 979 may include, for example, a motor, a piezoelectric element, or an electric stimulator.

The camera module 980 may shoot a still image or a video image. According to an embodiment, the camera module 980 may include, for example, at least one lens, an image sensor, an image signal processor, or a flash.

The power management module 988 may be a module for managing power supplied to the electronic device 901 and may serve as at least a part of a power management integrated circuit (PMIC).

The battery 989 may be a device for supplying power to at least one component of the electronic device 901 and may include, for example, a non-rechargeable (primary) battery, a rechargeable (secondary) battery, or a fuel cell.

The communication module 990 may establish a wired or wireless communication channel between the electronic device 901 and the external electronic device (e.g., the electronic device 902, the electronic device 904, or the server 908) and support communication execution through the established communication channel. The communication module 990 may include at least one communication processor operating independently from the processor 920 (e.g., the application processor) and supporting the wired communication or the wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication module) and may communicate with the external electronic device using a corresponding communication module among them through the first network 998 (e.g., the short-range communication network such as a Bluetooth, a WiFi direct, or an IrDA (infrared data association)) or the second network 999 (e.g., the long-distance wireless communication network such as a cellular network, an internet, or a computer network (e.g., LAN or WAN)). The above-mentioned various communication modules 990 may be implemented into one chip or into separate chips, respectively.

According to an embodiment, the wireless communication module 992 may identify and authenticate the electronic device 901 using user information stored in the subscriber identification module 996 in the communication network.

The antenna module 997 may include one or more antennas to transmit or receive the signal or power to or from an external source. According to an embodiment, the communication module 990 (e.g., the wireless communication module 992) may transmit or receive the signal to or from the external electronic device through the antenna suitable for the communication method.

Some components among the components may be connected to each other through a communication method (e.g., a bus, a general purpose input/output (GPIO), a serial peripheral interface (SPI), or a mobile industry processor interface (MIPI)) used between peripheral devices to exchange signals (e.g., a command or data) with each other.

According to an embodiment, the command or data may be transmitted or received between the electronic device 901 and the external electronic device 904 through the server 908 connected to the second network 999. Each of the electronic devices 902 and 904 may be the same or different types as or from the electronic device 901. According to an embodiment, all or some of the operations performed by the electronic device 901 may be performed by another electronic device or a plurality of external electronic devices. When the electronic device 901 performs some functions or services automatically or by request, the electronic device 901 may request the external electronic device to perform at least some of the functions related to the functions or services, in addition to or instead of performing the functions or services by itself. The external electronic device receiving the request may carry out the requested function or the additional function and transmit the result to the electronic device 901. The electronic device 901 may provide the requested functions or services based on the received result as is or after additionally processing the received result. To this end, for example, a cloud computing, distributed computing, or client-server computing technology may be used.

The electronic device 901 of FIG. 9 may correspond to the electronic device 100 described above with respect to FIGS. 1 to 8. For example, the memory 930 may correspond to the memory 125 described above. For example, the communication module 990 may correspond to the communication circuit 110 described above. For example, the sensor module 976 may correspond to the sensor module 130 described above. For example, the processor 920 may correspond to the processor 120 described above. In addition, as described above, the electronic device 100 may further include other components of the electronic device 901, in addition to the components described above.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 940) including an instruction stored in a non-transitory machine-readable storage media (e.g., an internal memory 936 or an external memory 938) readable by a machine (e.g., a computer). The machine may be a device that calls the instruction from the non-transitory machine-readable storage media and operates depending on the called instruction and may include the electronic device (e.g., the electronic device 901). When the instruction is executed by the processor (e.g., the processor 920), the processor may perform a function corresponding to the instruction directly or using other components under the control of the processor. The instruction may include a code generated or executed by a compiler or an interpreter. The non-transitory machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of a non-transitory machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding component prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
   at least one sensor;
   a communication circuit; and
   at least one processor operatively connected to the at least one sensor and the communication circuit, wherein the at least one processor is configured to:
receive, from a first base station through the communication circuit, a system information block including information about a plurality of coverage levels for random access to the first base station, the information about the plurality of coverage levels comprising a maximum preamble attempt number and a number of repetitions per preamble attempt for the plurality of coverage levels;
transmit, to the first base station through the communication circuit, a first message a plurality of times, the first message including a preamble with a first transmission power corresponding to a first coverage level of the plurality of coverage levels;
obtain, from the at least one sensor, movement information of the electronic device;
attempt random access to a second base station different from the first base station when a number of times corresponding to the plurality of times the first message is transmitted to the first base station is greater than or equal to a specified first value and the movement information of the electronic device meets a specified condition; and
transmit the first message to the first base station with a second transmission power corresponding to a second coverage level of the plurality of coverage levels, the second coverage level being higher than the first coverage level when the number of times corresponding to the plurality of times the first message is transmitted is greater than or equal to a specified second value and the movement information does not meet the specified condition, and
wherein the specified second value is set based on a first maximum preamble attempt number for the first coverage level and a first number of repetitions per preamble attempt for the first coverage level.

2. The electronic device of claim 1, wherein the at least one processor is further configured to attempt random access to the second base station when the number of times corresponding to the plurality of times the first message is transmitted is greater than or equal to the specified second value, the movement information of the electronic device does not meet the specified condition, and the first coverage level is a highest coverage level of the plurality of coverage levels.

3. The electronic device of claim 1, wherein the first transmission power corresponds to a transmission power lower than a maximum transmission power of the electronic device when the number of times corresponding to the plurality of times the first message is transmitted is less than a specified third value, and corresponds to the maximum transmission power of the electronic device when the number of times corresponding to the plurality of times the first message is transmitted the first message is greater than or equal to the specified third value.

4. The electronic device of claim 3, wherein the specified third value is set based on the movement information of the electronic device.

5. The electronic device of claim 4, wherein a transmission power corresponding to each of remaining coverage levels of the plurality of coverage levels, except for the first coverage level, corresponds to the maximum transmission power of the electronic device.

6. The electronic device of claim 1, wherein the at least one processor is further configured to determine whether to retransmit the first message based on a maximum number of repetitions per first preamble attempt corresponding to the first coverage level when a second message in response to the first message within a specified time window is not received from the first base station after the first message is transmitted at least once based on information about repetition per first preamble attempt corresponding to the first coverage level.

7. The electronic device of claim 1,
wherein the at least one sensor is configured to sense at least one of a speed of the electronic device, an acceleration of the electronic device, or location information of the electronic device,
wherein the communication circuit is configured to sense received power of a reference signal received from the first base station, and
wherein the movement information of the electronic device includes at least one of the speed of the electronic device, the acceleration of the electronic device, or the location information of the electronic device.

8. The electronic device of claim 7, wherein the specified condition includes at least one of a case where:
the speed of the electronic device is greater than or equal to a specified first range,
the acceleration of the electronic device is greater than or equal to a specified second range, or
a change in a location of the electronic device is greater than or equal to a specified third range.

9. The electronic device of claim 1,
wherein the communication circuit is configured to sense a received power of a reference signal received from the first base station, and
wherein the at least one processor is further configured to determine the first coverage level based on the received power of the reference signal.

10. The electronic device of claim 9, wherein the at least one processor determines the first coverage level based on a received power of a reference signal received last from the first base station and an average of received powers of a plurality of reference signals previously received from the first base station.

11. The electronic device of claim 1, wherein the electronic device includes a narrow band internet of things user equipment (NB IoT UE) or a bandwidth reduced low complexity (BL) UE.

12. A random access method of an electronic device, the random access method comprising:
receiving, from a first base station through a communication circuit, a system information block including information about a plurality of coverage levels for random access to the first base station, the information about the plurality of coverage levels comprising a maximum preamble attempt number and a number of repetitions per preamble attempt for the plurality of coverage levels;
transmitting, to the first base station through the communication circuit, a first message a plurality of times, the first message including a preamble with a first transmission power corresponding to a first coverage level of the plurality of coverage levels;
obtaining, from at least one sensor, movement information of the electronic device; and
attempting random access to the first base station or a second base station different from the first base station based on the movement information,
wherein the attempting random access comprises:
attempting the random access to the second base station when a number of times corresponding to the plurality of times the first message is transmitted to the first base station is greater than or equal to a specified first value and the movement information of the electronic device meets a specified condition; and attempting the random access by transmitting the first message to the first base station with a second transmission power corresponding to a second coverage level of the plurality of coverage levels, the second coverage level being higher than the first coverage level when the number of times corresponding to the plurality of times the first message is transmitted is greater than or equal to a specified second value and the movement information does not meet the specified condition, and wherein the specified second value is set based on a first maximum preamble attempt number for the first coverage level and a first number of repetitions per preamble attempt for the first coverage level.

13. An electronic device comprising:
a wireless communication circuit;
a motion sensor;
a processor electrically connected to the wireless communication circuit and the motion sensor; and
a memory electrically connected to the processor,
wherein the memory includes instructions, which when the instructions are executed, configure the processor to:
detect a movement of the electronic device by using the motion sensor;
perform a random access procedure for establishing a communication link with a base station of a lower power wide area network (LPWAN), and
when the detected movement exceeds a selected threshold:
attempt to establish a random access channel (RACH),
determine whether a number of transmissions of a first message is greater than or equal to a maximum number of preamble retransmissions of a current coverage level (CL) when the establishment of the RACH fails,
abort the random access procedure when the number of transmissions of the first message reaches the maximum number of preamble retransmissions, and
perform the random access procedure by increasing a number of preamble retransmissions when the number of transmissions of the first message does not reach the maximum number of preamble retransmissions.

14. The electronic device of claim 13, wherein the wireless communication circuit is implemented based at least on a 3rd generation partnership project (3GPP) technical specification (TS) 36.321.

15. The electronic device of claim 14, wherein the increasing of the number of preamble retransmissions includes changing a parameter referred to as a PREAMBLE_ TRANSMISSION_COUNTER.

16. The electronic device of claim 13, wherein the LPWAN includes narrowband Internet-of-Things (NB IoT) based on a 3rd generation partnership project (3GPP) standard.

17. The electronic device of claim 13, wherein the memory includes instructions, which when the instructions are executed, further configure the processor, when the detected movement is less than or equal to the selected threshold, to:
attempt to establish a RACH;
determine whether a current coverage level is a maximum coverage level when the establishment of the RACH fails;
abort the random access procedure when the current coverage level is a maximum coverage level; and
perform the random access procedure by increasing the number of preamble retransmissions when the current coverage level is not the maximum coverage level.

* * * * *